US009954237B2

(12) United States Patent
Ohno et al.

(10) Patent No.: US 9,954,237 B2
(45) Date of Patent: Apr. 24, 2018

(54) FUEL CELL AND FUEL CELL STACK

(75) Inventors: Takeshi Ohno, Komaki (JP); Dai Nishijima, Inuyama (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 223 days.

(21) Appl. No.: 14/113,004

(22) PCT Filed: Feb. 21, 2012

(86) PCT No.: PCT/JP2012/001135
§ 371 (c)(1),
(2), (4) Date: Oct. 21, 2013

(87) PCT Pub. No.: WO2012/144119
PCT Pub. Date: Oct. 26, 2012

(65) Prior Publication Data
US 2014/0057192 A1 Feb. 27, 2014

(30) Foreign Application Priority Data
Apr. 20, 2011 (JP) .................................. 2011-094249

(51) Int. Cl.
*H01M 8/04* (2016.01)
*H01M 8/04082* (2016.01)
(Continued)

(52) U.S. Cl.
CPC ..... *H01M 8/04201* (2013.01); *H01M 4/8626* (2013.01); *H01M 8/0247* (2013.01);
(Continued)

(58) Field of Classification Search
CPC ..... H01M 8/04201; H01M 2008/1293; H01M 8/0273; H01M 4/8626; H01M 8/04089;
(Continued)

(56) References Cited

U.S. PATENT DOCUMENTS

2006/0269828 A1   11/2006   Tanaka et al.
2007/0166596 A1    7/2007   Benson
(Continued)

FOREIGN PATENT DOCUMENTS

JP    41-014025 Y1    6/1966
JP    05-242894 A     9/1993
(Continued)

OTHER PUBLICATIONS

International Search Report for PCT/JP2012/001135 dated May 15, 2012.
(Continued)

*Primary Examiner* — Jonathan Jelsma
*Assistant Examiner* — Omar Kekia
(74) *Attorney, Agent, or Firm* — Sughrue Mion, PLLC

(57) ABSTRACT

A fuel cell and a fuel cell stack. A cathode (41) of a fuel cell (3) assumes the form of a square plate and is composed of a lower layer (61) on a side toward a solid oxide body (37), and an upper layer (63) which covers the outer surface of the lower layer (61). The lower layer (61) is square in planar shape, and its four side surfaces stand upright in its thickness direction. The upper layer (63) is square in planar shape and has a square main surface (outer surface) (65) which faces outward in its thickness direction, and side surfaces at its four sides. Opposite side surfaces (67) and (69) residing in a flow path extending between an oxidizing gas inlet side and an oxidizing gas outlet side are flat and inclined toward the center of the outer surface (65).

12 Claims, 9 Drawing Sheets

(51) Int. Cl.
| | |
|---|---|
| *H01M 4/86* | (2006.01) |
| *H01M 8/0247* | (2016.01) |
| *H01M 8/0273* | (2016.01) |
| *H01M 8/04089* | (2016.01) |
| *H01M 8/124* | (2016.01) |
| *H01M 8/2425* | (2016.01) |
| *H01M 8/00* | (2016.01) |

(52) U.S. Cl.
CPC ..... *H01M 8/0273* (2013.01); *H01M 8/04089* (2013.01); *H01M 8/006* (2013.01); *H01M 8/2425* (2013.01); *H01M 2008/1293* (2013.01); *Y02E 60/50* (2013.01); *Y02E 60/525* (2013.01)

(58) Field of Classification Search
CPC .. H01M 8/2425; H01M 8/0247; H01M 8/006; Y02E 60/525; Y02E 60/50
USPC .......................................................... 429/444
See application file for complete search history.

(56) References Cited

U.S. PATENT DOCUMENTS

| | | |
|---|---|---|
| 2007/0287048 A1 | 12/2007 | Couse et al. |
| 2008/0124601 A1 | 5/2008 | Ohmori et al. |
| 2008/0124608 A1 | 5/2008 | Yamamura |
| 2010/0062307 A1 | 3/2010 | Ueda et al. |
| 2011/0275001 A1 | 11/2011 | Chigusa et al. |

FOREIGN PATENT DOCUMENTS

| | | |
|---|---|---|
| JP | 9-180732 A | 7/1997 |
| JP | 2005-327637 A | 11/2005 |
| JP | 2006-331718 A | 12/2006 |
| JP | 2007-048568 A | 2/2007 |
| JP | 2007-053007 A | 3/2007 |
| JP | 2007-213830 A | 8/2007 |
| JP | 2007-533071 A | 11/2007 |
| JP | 2008-159566 A | 7/2008 |
| JP | 2010-067389 A | 3/2010 |
| JP | 2010-157390 A | 7/2010 |
| JP | 2010-272499 A | 12/2010 |

OTHER PUBLICATIONS

Communication dated Sep. 10, 2014, issued by the European Patent Office in corresponding European Application No. 12774748.3.
Communication dated Feb. 20, 2017, from the Canadian Intellectual Property Office in corresponding Canadian Application No. 2833343.

FUEL CELL AND FUEL CELL STACK

CROSS REFERENCE TO RELATED APPLICATIONS

This Application is a National Stage Entry of International Application No. PCT/JP2012/001135 filed Feb. 21, 2012, claiming priority based on Japanese Patent Application No. 2011-094249 filed Apr. 20, 2011, the contents of all of which are incorporated herein by reference in their entirety.

TECHNICAL FIELD

The present invention relates to a fuel cell for generating electric power through supply of oxidizing gas to a cathode and supply of fuel gas to an anode, and to a fuel cell stack having a plurality of the fuel cells.

BACKGROUND ART

A conventionally known type of fuel cell stack is a solid oxide fuel cell stack (hereinafter, may be referred to merely as a fuel cell stack) which uses a solid oxide as an electrolyte layer.

For example, Patent Document 1 mentioned below describes a known fuel cell assuming the form of a flat plate and having a laminar solid electrolyte formed of a solid oxide having ion conductivity, a laminar cathode provided on one side of the solid electrolyte and contacting with oxidizing gas (e.g., air or oxygen), and a laminar anode provided on the other side of the solid electrolyte and contacting with fuel gas (e.g., hydrogen, methane, or ethanol). Also, there has been developed a fuel cell stack having a structure in which a plurality of the fuel cells are stacked.

In order to favorably perform reaction between the cathode and oxidizing gas and reaction between the anode and fuel gas, the fuel cell stack of this type is usually configured to increase contact areas between the electrodes and the gases. For example, regarding a cathode side, oxidizing gas is introduced toward the cathode from the direction of a side surface of the cathode (i.e., along a direction perpendicular to the thickness direction) so as to supply oxidizing gas into a space between the main surface (the outer surface with respect to the thickness direction) of the cathode and a separator of the cell, thereby supplying oxidizing gas to the cathode.

In another case, for example, in order to establish electrical connection between the cathode and an external device (a device outside the cell), a current collector is disposed in contact with the outer surface of the cathode (the main surface of the cathode). In recent years, in order to ensure electrical communication between the cathode and the current collector, for example, increasing the thickness of the cathode has been proposed (see Patent Document 2 mentioned below).

PRIOR ART DOCUMENTS

Patent Documents

Patent Document 1: Japanese Patent Application Laid-Open (kokai) No. 2005-327637
Patent Document 2: Japanese Patent Application Laid-Open (kokai) No. 2010-272499

SUMMARY OF THE INVENTION

Problems to be Solved by the Invention

However, for example, in the case where the thickness of the cathode is increased as in the case of the technique described in the above-mentioned Patent Document 2, as shown in FIG. 13, a side surface of the cathode becomes an obstacle to introduction of oxidizing gas, resulting in difficulty in favorably supplying oxidizing gas to the outer surface of the cathode.

That is, when the cathode is thick, oxidizing gas hits against a precipitous side surface of the cathode and thus flows in a lateral direction (in the vertical direction in FIG. 13) along the side surface, resulting in a failure to sufficiently supply oxidizing gas to the outer surface (the main surface having a wide area) of the cathode.

As a result, variations in generation of electric power arise in a cell plane (a plane extending in the planar direction) corresponding to the outer surface of the cathode, leading to variations in heat in the cell plane and, in some cases, the risk of generation of a crack in the fuel cell.

Particularly, for example, in the case where only a small amount of oxidizing gas is supplied to the fuel cell as a result of variation of load (reduction of load) as in the case of generation of electric power in small amount at night, oxidizing gas may fail to be supplied to the cathode over the entire outer surface, potentially resulting in a failure to generate electric power in a desired amount.

The present invention has been conceived to solve the above-mentioned conventional problem, and an object of the invention is to provide a fuel cell and a fuel cell stack in which gases are supplied sufficiently to the outer surfaces (the main surfaces) of respective electrodes, such as the cathode.

Means for Solving the Problem (1) A first mode of the present invention provides a fuel cell assuming the form of a flat plate and comprising a cathode formed on one side of an electrolyte and an anode formed on the other side of the electrolyte, the fuel cell further comprising a first flow path formed on a side toward the cathode and adapted to supply oxidizing gas to the cathode from a predetermined first direction, and a second flow path formed on a side toward the anode and adapted to supply fuel gas to the anode from a predetermined second direction, the fuel cell being characterized in that the cathode or the anode has a platelike structure having a predetermined thickness, and a side surface of the platelike structure intersecting with the first direction along which the oxidizing gas flows in, or with the second direction along which the fuel gas flows in, is inclined such that one side of the side surface on a side opposite the electrolyte is located downstream, along a gas flow, of another side of the side surface on a side toward the electrolyte.

According to the present invention, a side surface (a side surface different from the main surface: a side surface intersecting with a plane which contains the main surface) of the platelike cathode or anode intersects with the first direction along which oxidizing gas flows in, or with the second direction along which fuel gas flows in (including the case of orthogonal intersection); furthermore, the side surface is inclined such that one side thereof on a side opposite the electrolyte is located downstream, along a gas flow, of another side thereof on a side toward the electrolyte. That is, a side surface of the cathode or anode is inclined such that an outer side thereof (a side thereof on a side opposite the electrolyte) is located downstream along a gas flow path.

(2) A second mode of the present invention provides a fuel cell assuming the form of a flat plate and comprising a cathode formed on one side of an electrolyte and an anode formed on the other side of the electrolyte, the fuel cell further comprising a first flow path formed on a side toward the cathode and adapted to supply oxidizing gas to the cathode from a predetermined first direction, and a second flow path formed on a side toward the anode and adapted to supply fuel gas to the anode from a predetermined second direction, the fuel cell being characterized in that each of the cathode and the anode has a platelike structure having a predetermined thickness, and a first side surface of the platelike structure intersecting with the first direction along which the oxidizing gas flows in, and a second side surface of the platelike structure intersecting with the second direction along which the fuel gas flows in, are inclined such that one side of each of the first and second side surfaces on a side opposite the electrolyte is located downstream, along a gas flow, of another side of each of the first and second side surfaces on a side toward the electrolyte.

According to the present invention, a side surface of the platelike cathode and a side surface of the platelike anode (a side surface different from the main surface: a side surface intersecting with a plane which contains the main surface) intersect respectively with the first direction along which oxidizing gas flows in and with the second direction along which fuel gas flows in (including the case of orthogonal intersection); furthermore, the side surfaces are inclined such that one side of each of the side surfaces on a side opposite the electrolyte is located downstream, along a gas flow, of another side of each of the side surfaces on a side toward the electrolyte. That is, a side surface of the cathode and a side surface of the anode are inclined such that an outer side of each of the side surfaces (a side of each of the side surfaces on a side opposite the electrolyte) is located downstream along a gas flow path.

(3) A third mode of the present invention is characterized in that: a frame structure is provided in such a manner as to surround the electrolyte, the cathode, and the anode along their side surfaces, and the frame structure has flow paths provided therein for introducing the oxidizing gas and the fuel gas, respectively.

(4) A fourth mode of the present invention is characterized in that: the cathode comprises a cathode active layer and a diffusion layer formed on a surface of the cathode active layer and allowing the oxidizing gas to diffuse to the cathode active layer, and only the diffusion layer is configured to be inclined.

The cathode active layer performs a reaction which a cathode is expected to perform for generating electric power; specifically, the cathode active layer has a function of generating water by use of oxygen contained in oxidizing gas, hydrogen ions supplied from the anode, and electrons supplied from an external circuit. In the case of a solid oxide fuel cell, the cathode active layer generates oxygen ions from oxygen contained in oxidizing gas, and the generated oxygen ions combine, through a solid electrolyte layer, with hydrogen ions generated in the anode, whereby water is generated.

(5) A fifth mode of the present invention is characterized in that the side surface is inclined at an angle of 30° to 85° with respect to a surface of the electrolyte.

(6) A sixth mode of the present invention is characterized in that the inclined side surface has a slit formed thereon along at least one of the first direction and the second direction.

(7) A seventh mode of the present invention is characterized in that the inclined side surface is a smooth surface or a stepped surface. Herein, the state of an inclined side surface of each of the electrodes is exemplified.

(8) An eighth mode of the present invention is characterized in that the fuel cell according to any one of claims 1 to 7 is a solid oxide fuel cell which uses a solid oxide as an electrolyte. Herein, the configuration of the fuel cell is exemplified.

(9) A ninth mode of the present invention provides a fuel cell stack comprising a single or a plurality of the fuel cells according to any one of claims 1 to 8. Herein, a fuel cell stack comprising a fuel cell(s) is exemplified.

Component materials in the present invention will be described below.

An example of the electrolyte is a solid electrolyte having ion conductivity. Examples of material for the solid electrolyte include $ZrO_2$ solid electrolyte, $LaGaO_3$ solid electrolyte, $BaCeO_3$ solid electrolyte, $SrCeO_3$ solid electrolyte, $SrZrO_3$ solid electrolyte, and $CaZrO_3$ solid electrolyte. Of these solid electrolytes, $ZrO_2$ solid electrolyte is preferred. $ZrO_2$ solid electrolyte which is stabilized or partially stabilized by use of an oxide of a rare-earth element, particularly $Y_2O_3$ or $Sc_2O_3$, is more preferred, since it has excellent ion conductivity and sufficient mechanical strength.

Examples of material for the anode are a mixture of metal oxide, such as Ni and Fe, (NiO, $Fe_2O_3$, etc.), and ceramic such as zirconia (preferably, zirconia stabilized or partially stabilized by use of, for example, yttria), ceria and manganese oxide. Furthermore, various metals and mixtures of metals and ceramic can also be used. Examples of the metals include Pt, Au, Ag, Pd, Ir, Ru, Rh, Ni, Fe, and alloys which contain two or more of these metals. Examples of mixtures of metals and ceramic include mixtures of these metals or alloys, zirconia ceramic (preferably, zirconia stabilized or partially stabilized by use of, for example, yttria), ceria, and manganese oxide. Of these mixtures, a mixture of nickel oxide (nickel oxide becomes Ni through reduction in operation of SOFC) and zirconia ceramic is preferred; more preferably, the zirconia ceramic is stabilized or partially stabilized by use of an oxide of a rare-earth element, particularly $Y_2O_3$ or $Sc_2O_3$.

Examples of material for the cathode include various metals, oxides of metals, and complex oxides of metals. Examples of the metals include Pt, Au, Ag, Pd, Ir, Ru, Rh, and alloys which contain two or more of these metals. Examples of the oxides of metals include oxides of La, Sr, Ce, Co, Mn, and Fe ($La_2O_3$, SrO, $Ce_2O_3$, $Co_2O_3$, $MnO_2$, and FeO). Furthermore, examples of the complex oxides of metals include complex oxides which contain at least La, Pr, Sm, Sr, Ba, Co, Fe, and Mn ($La_{1-x}Sr_xCoO_3$ complex oxides, $La_{1-x}Sr_xFeO_3$ complex oxides, $La_{1-x}Sr_xCo_{1-y}Fe_yO_3$ complex oxides, $La_{1-x}Sr_xMnO_3$ complex oxides, $Pr_{1-x}Ba_xCoO_3$ complex oxides, and $Sm_{1-x}Sr_xCoO_3$ complex oxides).

Effects of the Invention

The first mode of the present invention yields the following effect: even when a thick cathode and a thick anode are disposed within respective spaces (hereinafter, referred to as the gas chambers) and face (or directly face) inlets through which gases (oxidizing gas and fuel gas) flow into (are introduced into) the gas chambers, side surfaces of the cathode and anode are unlikely to become obstacles to introduction of the oxidizing gas and the fuel gas, and the introduced oxidizing gas and fuel gas are guided by the "inclined" side surfaces and are thereby favorably supplied to the outer surfaces; i.e., the main surfaces (having wide areas), of the cathode and the anode, respectively.

That is, the following effect is yielded: even when the cathode and the anode are large in thickness, the oxidizing gas and the fuel gas are unlikely to flow laterally as a result of being hindered by the side surfaces of the cathode and the anode, respectively; therefore, the oxidizing gas and the fuel gas are sufficiently supplied to the outer surfaces of the cathode and the anode, respectively.

As a result, the oxidizing gas and the fuel gas are easily distributed over the main surfaces of the respective electrodes, and variations in generation of electric power are thereby unlikely to occur in a cell plane; therefore, variations in heat in the cell plane are unlikely to arise, thereby yielding an advantage that the cell is unlikely to crack.

Therefore, particularly, even in the case where the oxidizing gas and the fuel gas are supplied to the cell only in small amount as a result of variation of load (reduction of load) as in the case of generation of electric power in small amount at night, the oxidizing gas and the fuel gas can be supplied sufficiently to the outer surfaces of the cathode and the anode, respectively, thereby yielding an advantage that electric power can be generated in a desired amount.

The second mode of the present invention yields the following effect: even when a thick cathode and a thick anode are disposed within respective gas chambers and face (or directly face) inlets through which gases (oxidizing gas and fuel gas) flow into (are introduced into) the gas chambers, side surfaces of the cathode and anode are unlikely to become obstacles to introduction of the oxidizing gas and the fuel gas, and the introduced oxidizing gas and fuel gas are guided by the "inclined" side surfaces and are thereby favorably supplied to the outer surfaces; i.e., the main surfaces (having wide areas), of the cathode and the anode, respectively.

That is, the following effect is yielded: even when the cathode and the anode are large in thickness, the oxidizing gas and the fuel gas are unlikely to flow laterally as a result of being hindered by the side surfaces of the cathode and the anode, respectively; therefore, the oxidizing gas and the fuel gas are sufficiently supplied to the outer surfaces (having wide areas) of the cathode and the anode, respectively.

As a result, the oxidizing gas and the fuel gas are easily distributed over the main surfaces of the respective electrodes, and variations in generation of electric power are thereby unlikely to arise in a cell plane; therefore, variations in heat in the cell plane are unlikely to arise, thereby yielding an advantage that the cell is unlikely to crack.

Therefore, particularly, even in the case where the oxidizing gas and the fuel gas are supplied to the cell only in small amount as a result of variation of load (reduction of load) as in the case of generation of electric power in small amount at night, the oxidizing gas and the fuel gas can be supplied sufficiently to the outer surfaces of the cathode and the anode, respectively, thereby yielding an advantage that electric power can be generated in a desired amount.

According to the third mode of the present invention, a frame structure can be provided in such a manner as to surround the electrolyte, the cathode, and the anode along their side surfaces, and the frame structure can have flow paths for introducing the oxidizing gas and the fuel gas, respectively. That is, the aforementioned "gas chambers" can be formed on the inside of the frame structure, and flow paths (inlets) for introducing the gases into the respective gas chambers can be formed in the frame structure.

According to the fourth mode of the present invention, in the case where the cathode comprises the cathode active layer and the diffusion layer, only the outer diffusion layer can have inclination. Even in the case where only the side surface of the diffusion layer is inclined, the gases can be introduced sufficiently toward the main surfaces of the electrodes. Also, by means of imparting "inclination" to only the diffusion layer of the cathode, "inclination" has little effect on the volume (decrease) of the cathode active layer, whereby the cathode active layer is free from damage to its function of performing a power generating reaction.

According to the fifth mode of the present invention, the side surfaces of the electrodes are inclined at an angle of 30° to 85°, whereby the gases can be effectively guided and introduced toward the main surfaces of the electrodes.

According to the sixth mode of the present invention, the side surfaces of the electrodes have a single or a plurality of slits (grooves) formed thereon along respective gas-introducing directions, whereby the gases can be favorably introduced toward the main surfaces of the electrodes.

MODES FOR CARRYING OUT THE INVENTION

Embodiments of the present invention will next be described.

First Embodiment a) First, the schematic configuration of a solid oxide fuel cell stack (hereinafter, referred to merely as the fuel cell stack) of the present embodiment will be described.

Figure 1:
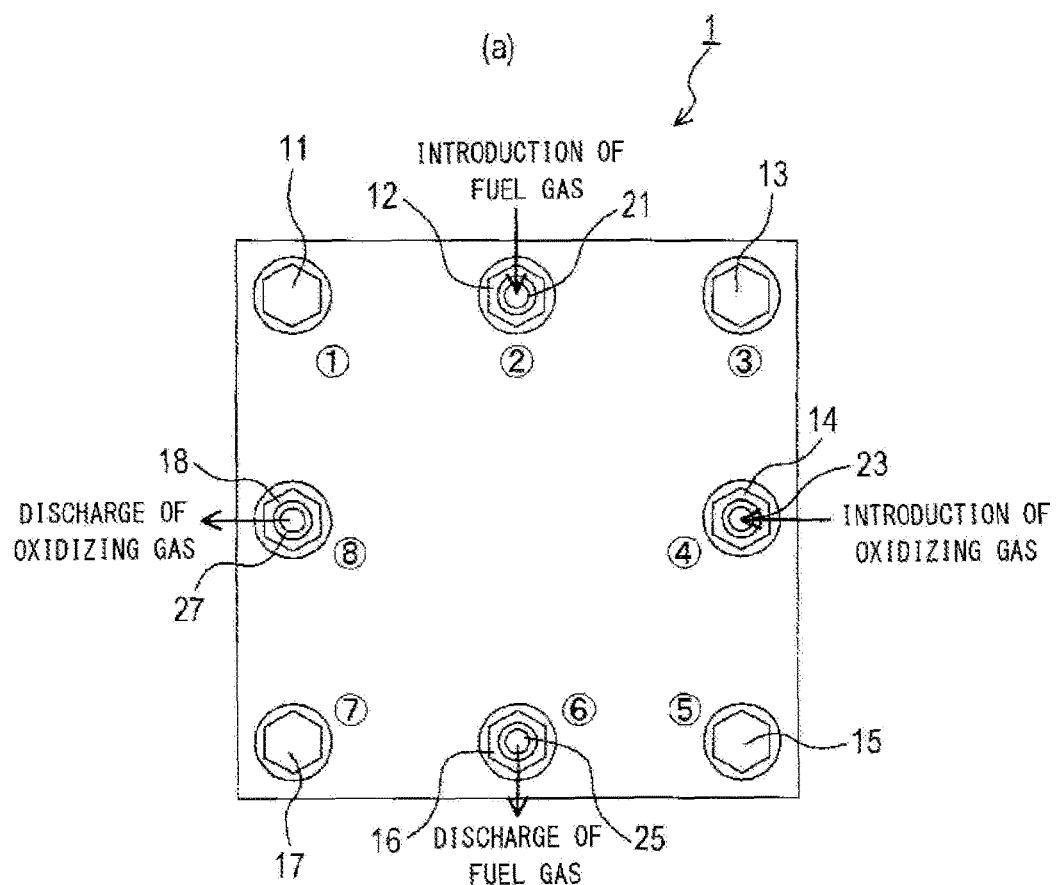
FIG. 1 A set of views showing a fuel cell stack of a first embodiment, wherein (a) is a plan view, and (b) is a front view.
Figure 1:
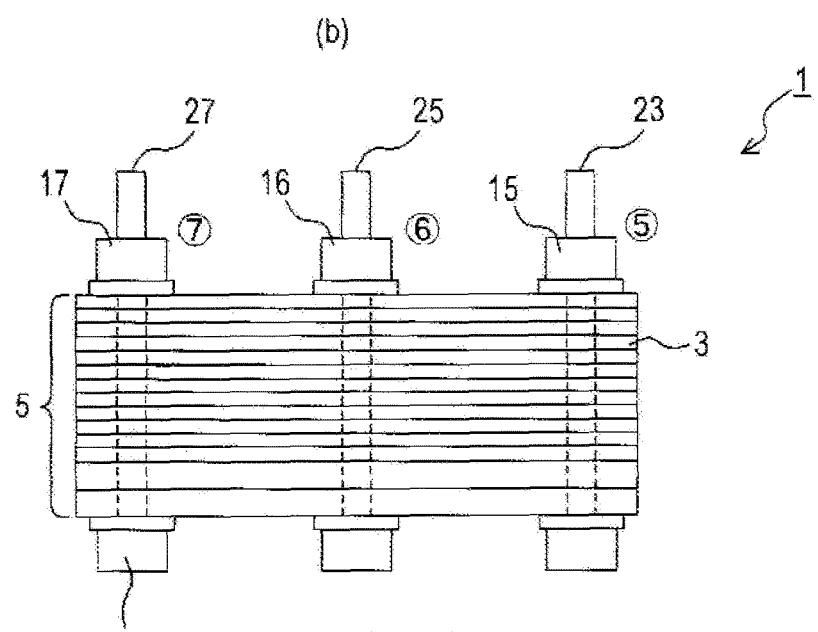

As shown in FIG. 1, a fuel cell stack 1 is a device for generating electric power through reception of fuel gas (e.g., hydrogen) and oxidizing gas (e.g., air).

The fuel cell stack 1 includes a fuel cell stack 5 in which a plurality of (e.g., 18) flat-platelike fuel cells 3, each serving as a power generating unit (power generating cell), are stacked; a plurality of bolts (first to eighth bolts) 11 to 18 extending through the fuel cell stack 5; and nuts 19 (general term) threadingly engaged with opposite ends of the bolts 11 to 18.

Of the bolts 11 to 18, the second bolt 12 has a fuel gas introduction tube 21 for supplying fuel gas to the fuel cell stack 1; the fourth bolt 14 has an oxidizing gas introduction tube 23 for supplying oxidizing gas to the fuel cell stack 1; the sixth bolt 16 has a fuel gas discharge tube 25 for discharging, from the fuel cell stack 1, the fuel gas which has been used for electric power generation; and the eighth bolt 18 has an oxidizing gas discharge tube 27 for discharging, from the fuel cell stack 1, the oxidizing gas which has been used for electric power generation.

Configurational features will next be described.

Figure 2:
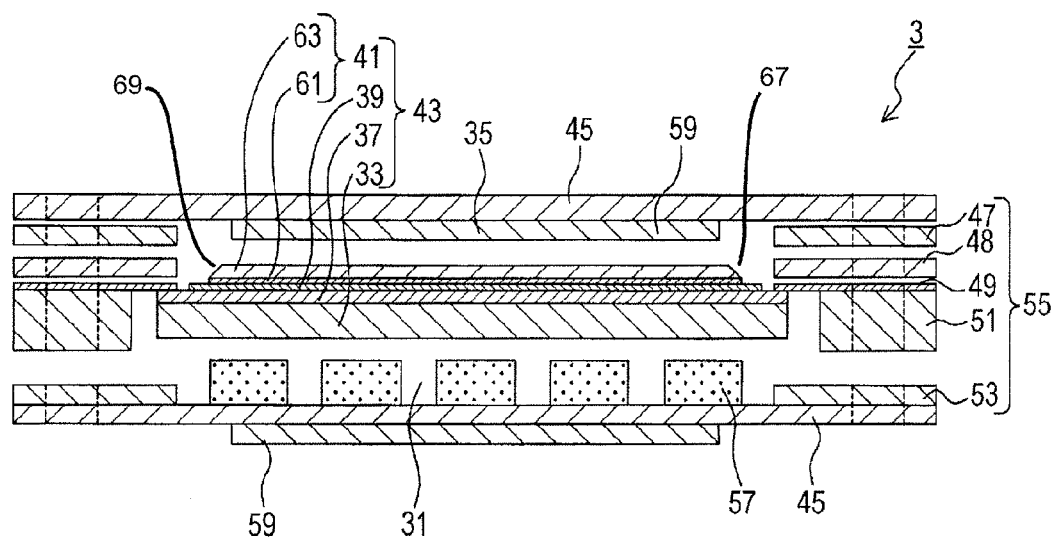
FIG. 2 Explanatory view showing a fuel cell of the first embodiment in a state in which the fuel cell is broken and disassembled in the thickness direction.

As shown in FIG. 2, which shows the fuel cell 3 in a disassembled state, the fuel cell 3 is a platelike fuel cell of a so-called anode support type. A platelike anode (anode) 33 is disposed on a side toward a fuel gas flow path 31 (lower side in FIG. 2) of the fuel cell 3, and a solid electrolyte (solid oxide body) 37 in the form of layer is formed on a surface, on a side toward an air flow path 35 (upper side in FIG. 2), of the anode 33. Furthermore, a reaction prevention layer 39 is formed on a surface, on the side toward the air flow path 35, of the solid oxide body 37, and a platelike cathode (cathode) 41 is formed on a surface, on the side toward the air path 35, of the reaction prevention layer 39. Notably, the anode 33, the solid oxide body 37, the reaction prevention layer 39, and the cathode 41 are collectively called a cell body 43.

The solid oxide body 37 is formed of a ceramic material having oxygen ion conductivity. Examples of material usable to form the solid oxide body 37 include zirconia oxides stabilized by use of yttria or scandium (YSZ and ScSZ), and perovskite-type oxides, such as lanthanum gallate oxides doped with strontium or magnesium.

Examples of material usable to form the anode 33 include porous bodies of a metal material, such as Ni, Pt, or Ir, and cermets of a metal material and a ceramic material, such as zirconia.

Examples of material usable to form the cathode 41 include a metal material, such as Pt or Ni, and a ceramic material, such as perovskite-type oxide.

Examples of material usable to form the reaction prevention layer 39 include ceria oxides doped with samarium or gadolinium (SDC and GDC).

The fuel cell 3 includes the following members laminated together between an upper interconnector 45 and a lower interconnector 45: a gas seal member 47 on a side toward the cathode 41; an insulating frame 48; a separator 49 bonded to the upper surface of an outer peripheral portion of the cell body 43 and adapted to separate the air flow path 35 and the fuel gas flow path 31 from each other; an anode frame 51 disposed on a side toward the fuel gas flow path 31; and a gas seal member 53 on a side toward the anode 33. The gas seal member 47 on the side toward the cathode 41, the insulating frame 48, the separator 49, the anode frame 51, and the gas seal member 53 on the side toward the anode 33 constitute a frame structure 55 which surrounds the cell body 43 from lateral directions.

Furthermore, in the fuel cell 3, an anode-side current collector 57 is disposed between the anode 33 and the interconnector 45 on the lower side in FIG. 2, and a cathode-side current collector 59 is formed on one side (lower side in FIG. 2) of each of the interconnectors 45.

In the present embodiment, the cathode-side current collector 59 has a plurality of the air flow paths 35 formed thereon in parallel with one another, and air flows in the air flow paths 35 in the left-right direction in FIG. 2. Similarly, the anode-side current collector 57 has a plurality of the fuel gas flow paths 31 formed thereon in parallel with one another, and the fuel gas flows in the fuel gas flow paths 31 in a direction perpendicular to the paper on which FIG. 2 appears. In this manner, the air flow paths 35 and the fuel gas flow paths 31 are disposed orthogonally to each other (see FIG. 3).

Examples of material usable to form the anode-side current collector 57 and the cathode-side current collector 59 include metal materials, such as Pt and Ni, and cermets. The fuel cell stack 5 is composed of a plurality of the fuel cells 3 connected electrically in series.

Particularly, in the present embodiment, as shown in FIG. 3(a) which shows the planar shape of the cathode 41, the cathode 41 has a platelike shape whose planar shape is square; also, as shown in FIG. 3(b) which schematically shows the fuel cell 3 in section, the cathode 41 is composed of a lower layer 61 located on a side toward the solid oxide body 37 and having a thickness of 10 μm to 30 μm and an upper layer 63 covering the outer surface (the upper side in FIG. 3(b)) of the lower layer 61 and having a thickness of 100 μm to 300 μm.

The lower layer 61 and the upper layer 63 are porous bodies formed of similar materials; however, the upper layer 63 is more porous (has more pores) than the lower layer 61. Specifically, the upper layer 63 is a sintered body formed from a powder material having a particle size of 1 μm to 10 μm, whereas the lower layer 61 is a sintered body formed from a powder material having a particle size of less than 1 μm.

The lower layer 61 is square in planar shape, and four side surfaces of the lower layer 61 stand parallel to the thickness direction. The upper layer 63 is square in planar shape and has a square main surface (outer surface) 65 (in contact with oxidizing gas and having a large area) located outside with respect to its thickness direction, as well as four side surfaces.

Figure 3:
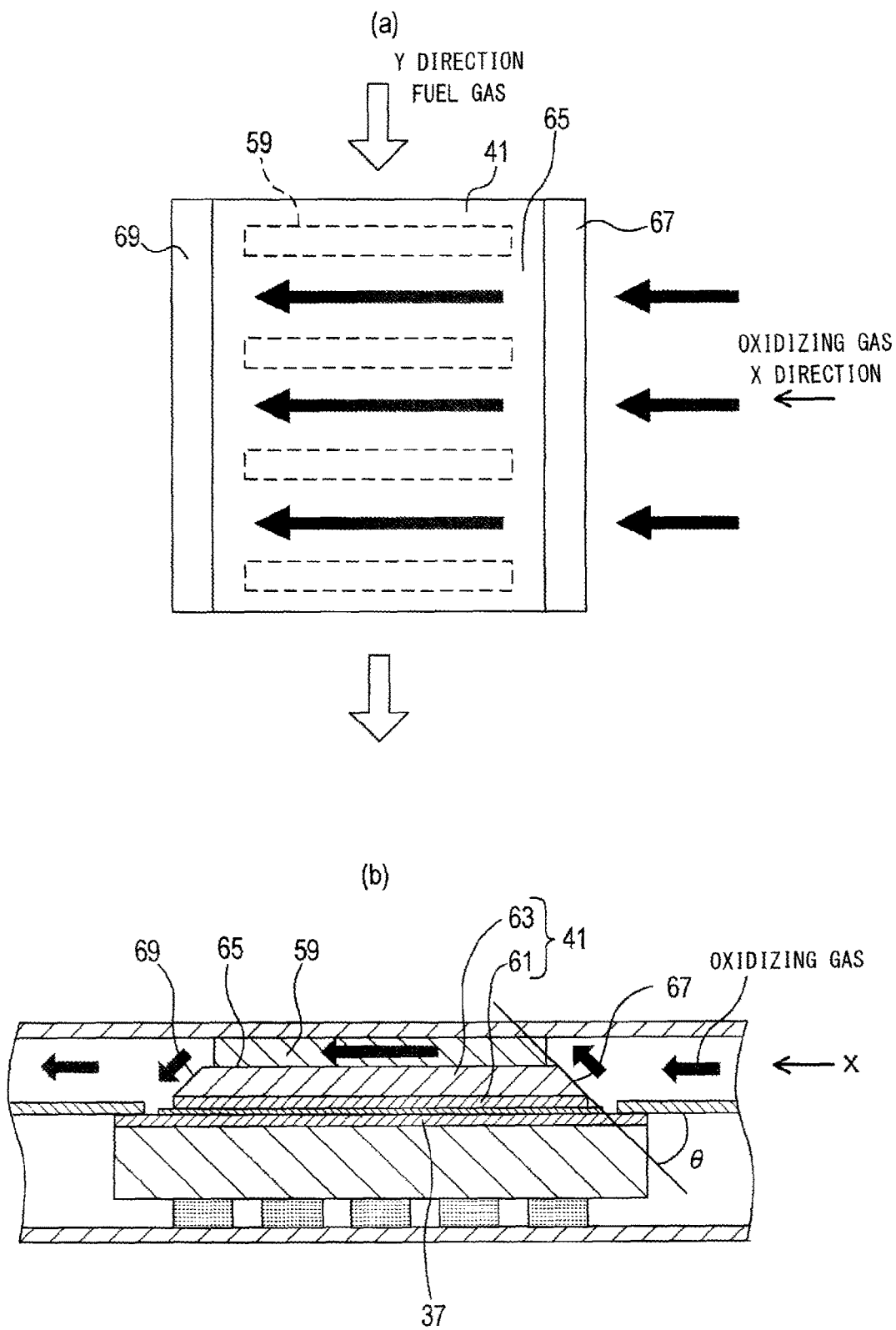
FIG. 3 A set of explanatory views, wherein (a) shows the flow of oxidizing gas in the plane of a cathode, and (b) schematically shows the fuel cell in section taken in the thickness direction.

Particularly, of the side surfaces of the upper layer 63, opposite side surfaces 67 and 69 (left and right side surfaces in FIG. 3) residing in the flow path of oxidizing gas on an oxidizing gas introduction side and on an oxidizing gas discharge side, respectively, are such flat inclined surfaces as to be inclined toward the center (with respect to the left-right direction in FIG. 3) of the outer surface 65, in order to smoothly lead the oxidizing gas toward the outer surface 65 (upward in FIG. 3(b)).

That is, as shown in FIG. 3(a), the side surface 67 of the upper layer 63 on the oxidizing gas introduction side extends vertically in the drawing and intersects with a first direction (the X direction indicated by the arrow in the drawing) along which the oxidizing gas flows in; furthermore, as shown in FIG. 3(b), the side surface 67 is inclined such that a side of the side surface 67 on a side toward the outer surface 65 is located downstream (leftward in the drawing) along the oxidizing gas flow. The inclination angle (an inclination angle θ with respect to the surface of the solid oxide body 37) falls within a range of 30° to 85° and is, for example, 40° to 70°. As shown in FIG. 3(a), the flowing direction (Y direction) of fuel gas is orthogonal to the flowing direction (X direction) of oxidizing gas.

Meanwhile, the side surface 69 of the upper layer 63 on the oxidizing gas discharge side is inclined in a direction opposite the direction of inclination of the side surface 67 on the oxidizing gas introduction side; i.e., the side surface 69 is inclined such that a side of the side surface 69 on the side toward the outer surface 65 is located upstream (rightward in the drawing) along the oxidizing gas flow. Notably, the side surface 69 may not be inclined.

The remaining opposite side surfaces other than the opposite right and left side surfaces 67 and 69 in FIG. 3 may be inclined similarly such that their sides on the side toward the outer surface 65 are located toward the center of the outer surface 65, or may not be inclined.

Next, of component members of the fuel cell 3, component members of, in particular, the outer peripheral frame structure 55 will be described. Since the fuel cell 3 is square in planar shape, the component members of the fuel cell 3 are also square in planar shape.

Figure 4:
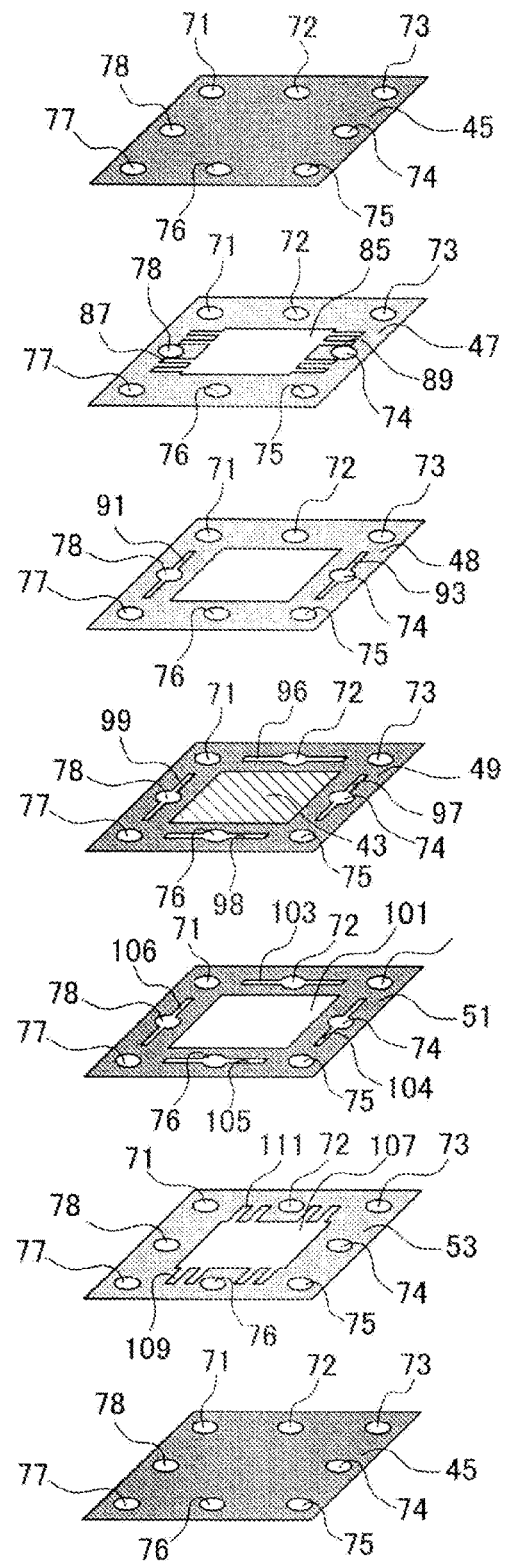
FIG. 4 Exploded perspective view showing the fuel cell.

As shown in an exploded fashion in FIG. 4, each of the interconnectors 45 is a plate member of, for example, ferritic stainless steel and has round through-holes (first to eighth through-holes) 71 to 78 (like reference numerals are used for corresponding through-holes formed in other members) which are formed at its outer peripheral portion at equal intervals and through which the bolts 11 to 18 are inserted, respectively.

The gas seal member 47 on the side toward the cathode 41 is a frame-like plate member of, for example, mica and has the through-holes 71 to 78 formed at its outer peripheral portion.

Furthermore, the gas seal member 47 has a plurality of rectangular slits 87 and a plurality of rectangular slits 89 which are formed at its left and right frame portions, respectively, in such a manner as to communicate with a central square opening 85 and which serve as thin gas flow paths (flow paths which communicate with the air flow paths 35).

The slits 87 and 89 extend through the gas seal member 47 in the vertical direction and can be formed by performing laser beam machining or press working on the gas seal member 47. The insulating frame 48 is a frame-like plate member of, for example, mica and has the through-holes 71 to 78 formed at its outer peripheral portion. The insulating frame 48 has slits 91 and 93 formed therein in such a manner as to extend in opposite directions from the left and right through-holes 78 and 74, respectively, in FIG. 4 along the respective sides of the insulating frame 48. The slits 91 and 93 communicate with the left and right slits 87 and 89, respectively, of the gas seal member 47.

Furthermore, the separator 49 is a frame-like plate member of, for example, ferritic stainless steel, and has a central square opening 95 formed therein and covered by the cell body 43 bonded thereto.

Similar to the gas seal member 47, the separator 49 also has the through-holes 71 to 78 formed at its outer peripheral portion. The separator 49 has slits 96, 97, 98, and 99 formed therein in such a manner as to extend from the through-holes 72, 74, 76, and 78, respectively, along the respective sides of the separator 49.

Furthermore, the anode frame 51 is a frame-like plate member of, for example, ferritic stainless steel and has a central opening 101. Similar to the separator 49, the anode frame 51 has the through-holes 71 to 78 formed at its outer peripheral portion. Similar to the separator 49, the anode frame 51 has slits 103, 104, 105, and 106 formed therein in such a manner as to extend from the through-holes 72, 74, 76, and 78, respectively, along the respective sides of the anode frame 51.

Similar to the gas seal member 47 on the side toward the cathode 41, the gas seal member 53 on the side toward the anode 33 is a frame-like plate member of, for example, mica and has an opening 107 formed at its center and the through-holes 71 to 78 formed at its outer peripheral portion.

The gas seal member 53 also has a plurality of slits 109 and 111 which are formed at its opposite frame portions, respectively, in such a manner as to communicate with the opening 107 and which serve as thin gas flow paths (flow paths which communicate with the fuel gas flow paths 31). The slits 109 and 111 communicate with the slits 105 and 103, respectively, of the gas seal member 51.

b) Next, a method of manufacturing an essential member (the cell body 43) of the fuel cell 3 will be described.

(1) To a mixed powder (100 parts by weight) of an NiO powder (60 parts by weight) and a YSZ powder (40 parts by weight) for forming an anode-substrate green sheet, there were added organic beads (10% by weight of the mixed powder) as a pore-forming material, butyral resin, DOP as plasticizer, dispersant, and a mixed solvent of toluene and ethanol. The resultant mixture was milled in a ball mill, thereby yielding slurry. The obtained slurry was subjected to a doctor blade process, thereby forming an anode-substrate green sheet having a thickness of 250 μm.

(2) Formation of Solid-electrolyte-layer Green Sheet

To a YSZ powder (100 parts by weight), there were added butyral resin, DOP as plasticizer, dispersant, and a mixed solvent of toluene and ethanol. The resultant mixture was milled in a ball mill, thereby yielding slurry. The obtained slurry was subjected to a doctor blade process, thereby forming a solid-electrolyte-layer green sheet having a thickness of 10 μm.

(3) Formation of Fired Laminate

Next, the anode-substrate green sheet and the solid-electrolyte-layer green sheet were laminated together. The resultant laminate was fired, thereby yielding a fired laminate.

(4) Formation of Reaction Prevention Layer

Next, GDC (gadolinium-doped ceria) paste was applied, by printing, to the solid electrolyte of the fired laminate, followed by baking to form the reaction prevention layer 39.

(5) Formation of Cathode

Next, a cathode paste layer was formed on the reaction prevention layer 39 of the fired laminate as described below. Then, the paste layer was baked to form the cell body 43.

In formation of the cathode 41, first, a component material of the cathode 41 for forming the lower layer 61 of the cathode 41 was prepared; specifically, GDC was added to a powder material (e.g., LSCF) having a particle size of less than 1 μm, and, by use of the resultant mixture, a lower-layer paste was prepared as a material of constituting the cathode 41. Then, by use of a known mask (a mask (not shown)

having a square opening corresponding to the planar shape of the lower layer 61), the lower-layer paste was screen-printed on the reaction prevention layer 39 at a thickness of about 20 μm, thereby forming a green lower layer.

Figure 5:
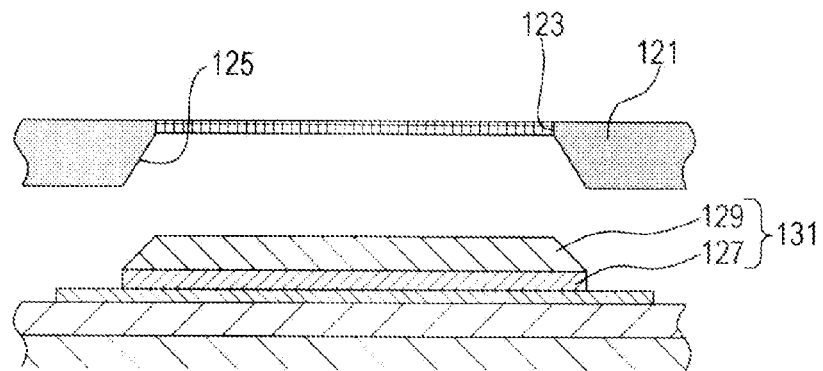
FIG. 5 Explanatory view showing a method of forming the cathode of the fuel cell.

Next, as schematically shown in FIG. 5, an upper-layer-forming mask 121 is prepared. The mask 121 has a square opening 123 corresponding to the planar shape of the upper layer 63, and an inner peripheral surface 125 of the opening 123 is inclined according to the inclined side surfaces 67 and 69 of the upper layer 63 (in such a manner as to fan out downward) at an angle similar to that of the inclined side surfaces 67 and 69.

Then, a component material of the cathode 41 for forming the upper layer 63 was prepared; specifically, an upper-layer paste was prepared from a powder material (e.g., LSCF) having a particle size of 1 μm to 10 μm. By use of the above-mentioned upper-layer-forming mask 123, the upper-layer paste was screen-printed on the green lower layer 127 at a thickness of about 300 μm.

Thus, a green air layer 131 is formed such that a green upper layer 129 whose opposite side surfaces are inclined at an angle of 35° to 80° is laminated on the green lower layer 127.

Subsequently, the green cathode 131 was fired, thereby forming the cathode 41 and completing the cell body 43.

Subsequently, in a manner similar to a conventional manner, the cell body 43 is combined with other members, thereby forming the fuel cell 3. A plurality of the fuel cells 3 are stacked in their thickness direction, thereby forming the fuel cell stack 1.

c) Next, the effects of the present embodiment will be described.

According to the present embodiment, a side surface of the platelike cathode 41 intersects with the first direction (X direction) along which oxidizing gas flows in; furthermore, the side surface is inclined such that one side of the side surface on a side opposite the solid oxide body 37 is located downstream, along an oxidizing gas flow, of another side of the side surface on a side toward the solid oxide body 37. That is, a side surface of the cathode 41 is inclined such that an outer side (side opposite the solid oxide body 37) of the side surface is located downstream along a gas flow path.

Thus, even when the cathode 41 is large in thickness, a side surface of the cathode 41 is unlikely to become an obstacle to introduction of oxidizing gas; therefore, the oxidizing gas is favorably introduced to the outer surface 65; i.e., the main surface (having a wide area), of the cathode 41. That is, the following effect is yielded: even when the cathode 41 is large in thickness, the oxidizing gas is unlikely to flow laterally along the side surface of the cathode 41; therefore, the oxidizing gas is supplied sufficiently to the outer surface 65 (having a wide area) of the cathode 41.

As a result, since variations in generation of electric power are unlikely to arise in the cell plane of the fuel cell 3, variations in heat in the cell plane are unlikely to arise, thereby yielding an advantage that the fuel cell 3 is unlikely to crack.

Furthermore, even in the case where oxidizing gas is supplied to the fuel cell 3 only in small amount as a result of variation of load (reduction of load) as in the case of generation of electric power in small amount at night, the oxidizing gas can be supplied sufficiently to the outer surface 65 of the cathode 41, thereby yielding an advantage that electric power can be generated in a desired amount.

Also, according to the present embodiment, since a side surface of the cathode 41 is inclined at an angle of 30° to 85° with respect to the surface of the solid oxide body 37, oxidizing gas can be supplied favorably to the main surface of the cathode 41.

Preferably, the opposite side surfaces 67 and 69 of the upper layer 63 of the cathode 41 are inclined. However, only the side surface on the oxidizing gas introduction side may be inclined. Alternatively, all side surfaces (four side surfaces) of the cathode 41 may be similarly inclined.

d) Next, an experiment conducted for confirming the effects of the present embodiment will be described.

Sample fuel cells were manufactured by the above-described manufacturing method such that opposite side surfaces (residing in an oxidizing gas flow) of cathodes thereof were inclined at an angle of 35° to 80°. Specifically, sample fuel cells were manufactured such that opposite side surfaces of cathodes thereof were inclined at an angle of 35°, 45°, 55°, 65°, 75°, and 80°.

The sample fuel cells were subjected to an experiment in cathode limiting-current characteristic. The sample fuel cells having an inclination angle which fell within the above-mentioned range exhibited the following favorable experiment result: inflection point of significant voltage drop >2 A/cm².

Meanwhile, sample fuel cells having an inclination angle of 30° and 85° were manufactured and subjected to a similar experiment. The sample fuel cells exhibited the experiment result "inflection point of significant voltage drop <2 A/cm²," indicating that the sample fuel cells are inferior in performance to those of the present embodiment.

Second Embodiment

Next, a second embodiment of the present invention will be described; however, description of features similar to those of the first embodiment described above is omitted.

Figure 6:
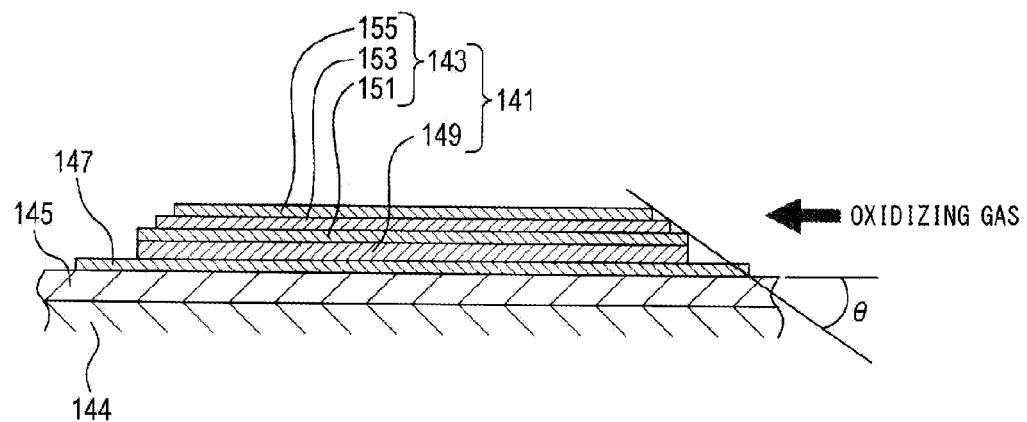
FIG. 6 A set of explanatory views, wherein (a) shows a cathode region of a fuel cell of a second embodiment in section taken in the thickness direction, and (b) shows a method of forming the cathode of the fuel cell.
Figure 6:
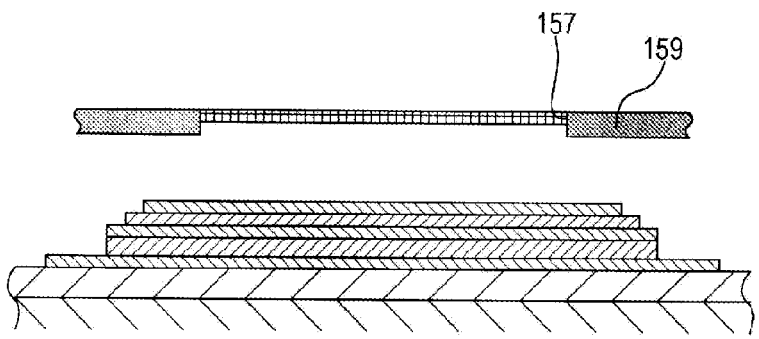

As shown schematically in FIG. 6(a), in a fuel cell of the present embodiment, an upper layer 143 of a cathode 141 is formed stepwise.

Specifically, in the present embodiment, similar to the first embodiment described above, a solid oxide body 145 is formed on an anode 144; a reaction prevention layer 147 is formed on the solid oxide body 145; a lower layer 149 of the cathode 141 is formed on the reaction prevention layer 147; and the upper layer 143 is formed on the lower layer 149.

The upper layer 143 is a laminate of layers 151, 153, and 155, and the lengths of the layers 151, 153, and 155 along the direction of oxidizing gas flow (in the left-right direction in FIG. 6(a)) reduce in a direction opposite the solid oxide body 145 (in the upward direction in FIG. 6(a)).

As shown in FIG. 6(b), the upper layer 143 is formed as follows: there are prepared a plurality of masks 159 which differ in the size of an opening 157 according to the sizes of the component layers 151 to 155 of the upper layer 143 (FIG. 6(b) shows only one mask corresponding to the layer 155), and the layers are sequentially laminated from the bottom one in the descending order of area. The masks 159 to be used have the following feature: the inner peripheral surface of the opening 157 is not inclined (as in the case of the first embodiment described above), but stands perpendicularly in the thickness direction.

The angle (θ) of inclination in the present embodiment is the angle of inclination of a plane which connects the upper ends (or lower ends) of the component layers 151 to 155 of the upper layer 143. The present embodiment also yields effects similar to those yielded by the first embodiment described above.

Third Embodiment

Next, a third embodiment of the present invention will be described; however, description of features similar to those of the first embodiment described above is omitted.

Figure 7:
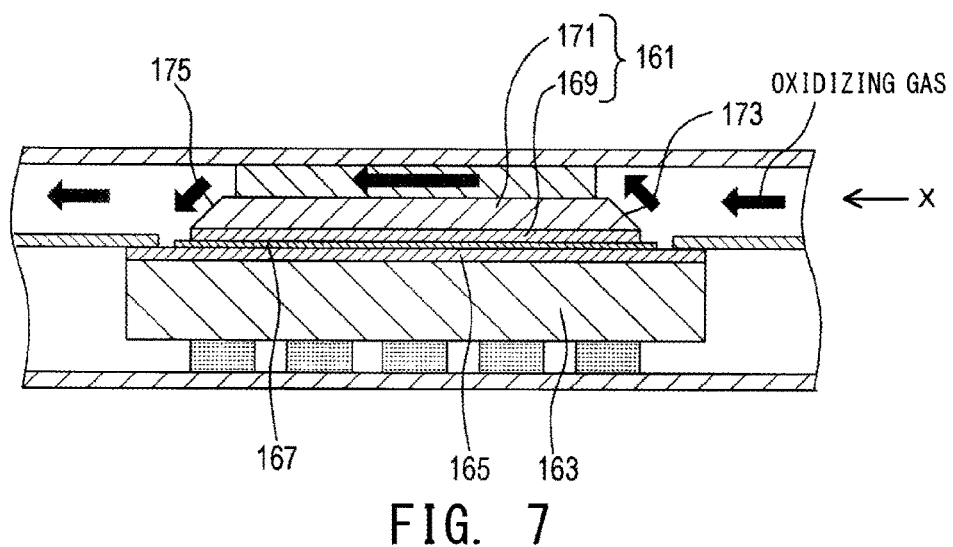
FIG. 7 Explanatory view schematically showing a fuel cell of a third embodiment in section taken in the thickness direction.

In the fuel cell of the present embodiment, as schematically shown in FIG. 7, a cathode 161 is similar in shape to that of the first embodiment described above, but differs in function.

Specifically, in the present embodiment, similar to the first embodiment described above, an anode 163 and a solid oxide body 165 are provided; a reaction prevention layer 167 is formed on the solid oxide body 165; and the cathode 161 is formed on the reaction prevention layer 167.

Also, similar to the first embodiment described above, the cathode 161 is composed of a platelike lower layer 169 having a square planar shape, and an upper layer 171 formed on the lower layer 169 and having a square planar shape, and opposite side surfaces 173 and 175 (residing in the direction of oxidizing gas flow (in the left-right direction in FIG. 7)) of the upper layer 171 are similarly inclined inward.

Particularly, in the present embodiment, the lower layer 169 is a cathode active layer (catalytic layer) having an original function of the cathode; i.e., a function of generating electric power through electrochemical reaction, and the upper layer 171 is a diffusion layer having electrical conductivity and allowing oxidizing gas to diffuse to the lower layer 169.

Specifically, the lower layer 169 is formed of, for example, a cermet of a metal material, such as Pt or Ni, and a ceramic material, such as a perovskite-type oxide, and the upper layer 171 is formed of, for example, a porous substrate having electrical conductivity, such as carbon paper.

In the present embodiment, the cathode 161 is formed as follows: first, similar to the first embodiment, by use of a lower-layer paste, a green lower layer is formed through screen printing on the reaction prevention layer 167; subsequently, a green upper layer is formed through screen printing on the green lower layer; then, firing is performed.

The present embodiment also yields effects similar to those yielded by the first embodiment described above.

Fourth Embodiment

Next, a fourth embodiment of the present invention will be described; however, description of features similar to those of the first embodiment described above is omitted.

Figure 8:
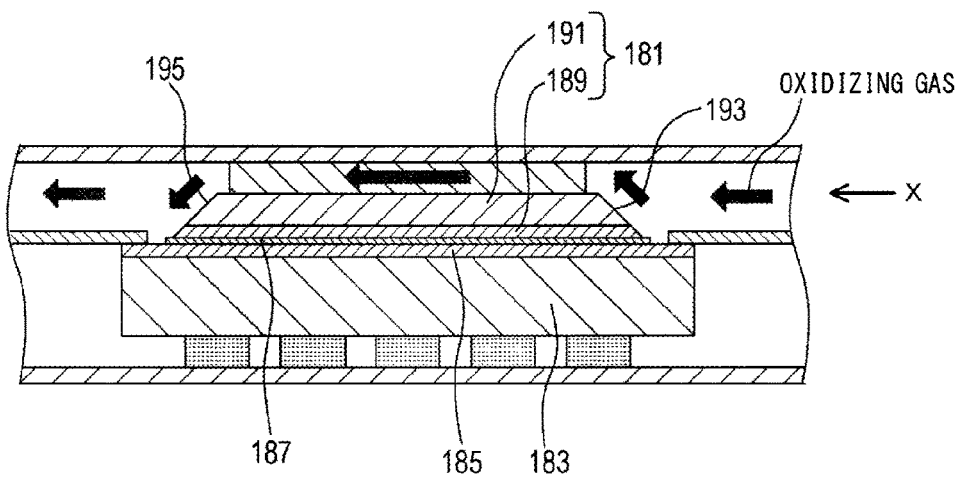
FIG. 8 Explanatory view schematically showing a fuel cell of a fourth embodiment in section taken in the thickness direction.

In the fuel cell of the present embodiment, as schematically shown in FIG. 8, a cathode 181 differs slightly in shape from that of the first embodiment described above.

Specifically, in the present embodiment, similar to the first embodiment described above, an anode 183 and a solid oxide body 185 are provided; a reaction prevention layer 187 is formed on the solid oxide body 185; and the cathode 181 is formed on the reaction prevention layer 187.

Also, similar to the first embodiment described above, the cathode 181 is composed of a platelike lower layer 189 having a square planar shape, and an upper layer 191 formed on the lower layer 189 and having a square planar shape, and opposite side surfaces 193 and 195 (residing in the direction of oxidizing gas flow (in the left-right direction in FIG. 8: X direction)) of the upper layer 191 are similarly inclined inward.

Particularly, in the present embodiment, the left and right side surfaces of the lower layer 189 and the left and right side surfaces of the upper layer 191 form the same planes, respectively. That is, the opposite side surfaces of the lower layer 189 are inclined at angles respectively similar to those of the opposite side surfaces of the upper layer 191.

In order to incline the side surfaces of the lower layer 189, there may be used a mask similar to that used in the first embodiment for forming the upper layer; i.e., a mask whose inner peripheral surface of an opening is inclined.

The present embodiment also yields effects similar to those yielded by the first embodiment described above.

Fifth Embodiment

Next, a fifth embodiment of the present invention will be described; however, description of features similar to those of the fourth embodiment described above is omitted.

Figure 9:
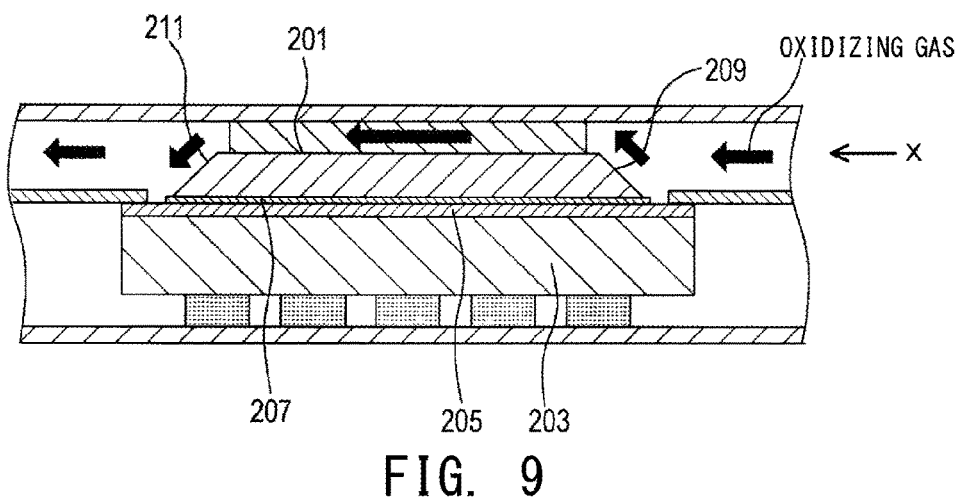
FIG. 9 Explanatory view schematically showing a fuel cell of a fifth embodiment in section taken in the thickness direction.

In the fuel cell of the present embodiment, as schematically shown in FIG. 9, a cathode 201 is similar in shape to that of the fourth embodiment described above, but differs in structure.

Specifically, in the present embodiment, similar to the fourth embodiment described above, an anode 203 and a solid oxide body 205 are provided; a reaction prevention layer 207 is formed on the solid oxide body 205; and the cathode 201 is formed on the reaction prevention layer 207.

Also, the cathode 201 has a platelike shape whose planar shape is square. However, the cathode 201 does not have a two-layer structure composed of a lower layer and an upper layer as in the case of the fourth embodiment described above. Instead, the entire cathode 201 is formed of a material similar to that for the lower layer mentioned above.

Therefore, opposite side surfaces 209 and 211 (residing in the direction of oxidizing gas flow (in the left-right direction in FIG. 9: X direction)) of the cathode 201 are inclined similar to the fourth embodiment described above.

The present embodiment also yields effects similar to those yielded by the first embodiment described above.

Sixth Embodiment

Next, a sixth embodiment of the present invention will be described; however, description of features similar to those of the fifth embodiment described above is omitted.

Figure 10:
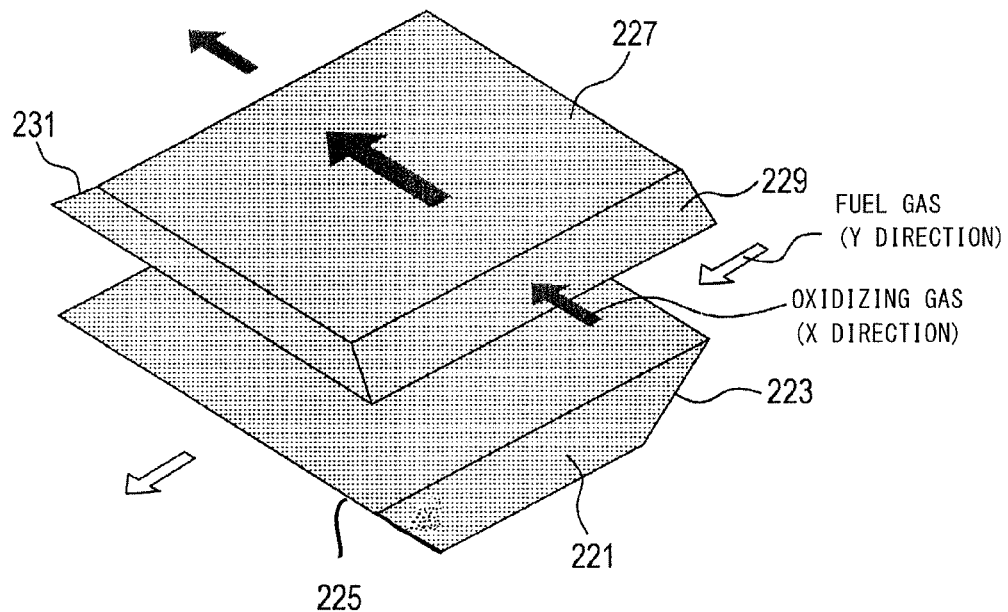
FIG. 10 Perspective view showing a cathode and an anode of a fuel cell of a sixth embodiment.

In the fuel cell of the present embodiment, as schematically shown in FIG. 10 which shows only the electrodes, opposite side surfaces 223 and 225 of an anode 221 residing in the direction of fuel gas flow (Y direction) are inclined. The direction of oxidizing gas flow (X direction) is orthogonal to the Y direction.

Specifically, in the present embodiment, similar to the fifth embodiment described above, although unillustrated, the anode and the solid oxide body are provided; the reaction prevention layer is formed on the solid oxide body; and a cathode 227 is formed on the reaction prevention layer.

The cathode 227 has a platelike shape whose planar shape is square, and opposite side surfaces 229 and 231 residing in the direction of oxidizing gas flow are inclined similar to the fifth embodiment described above.

Particularly, in the present embodiment, the opposite side surfaces 223 and 225 of the anode 221 are inclined at an angle of 35° to 80° similar to the opposite side surfaces 229 and 231 of the cathode 227.

The present embodiment yields, with respect to fuel gas, an effect (an effect of smoothly lead fuel gas to the main surface of the anode 221) similar to that yielded by the first embodiment described above.

The opposite side surfaces 229 and 231 of the cathode 227 may not be inclined. On the contrary, all side surfaces of the cathode 227 and the anode 221 may be inclined similarly.

Seventh Embodiment

Next, a seventh embodiment of the present invention will be described; however, description of features similar to those of the fifth embodiment described above is omitted.

Figure 11:
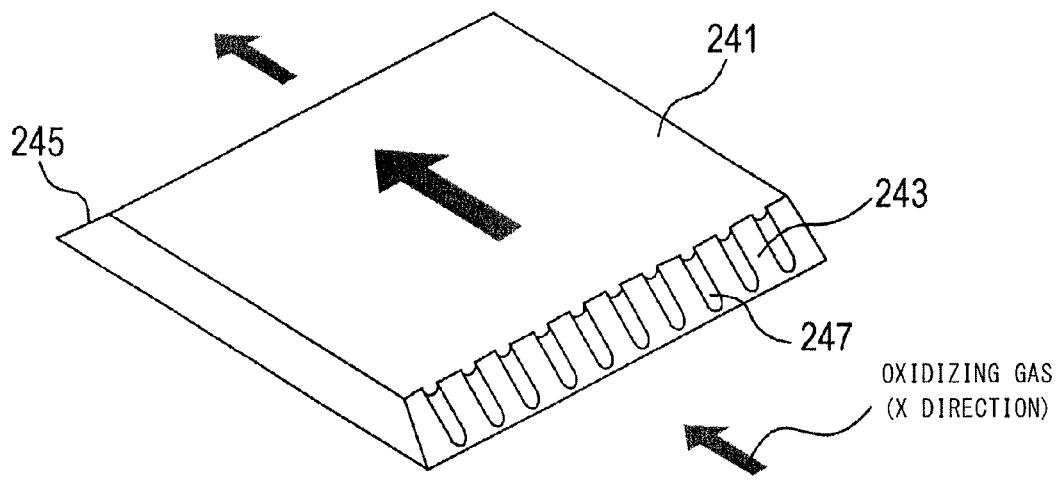
FIG. 11 Perspective view showing a cathode of a fuel cell of a seventh embodiment.

In the fuel cell of the present embodiment, as schematically shown in FIG. 11 which shows only the cathode, opposite side surfaces 243 and 245 (residing in the direction of oxidizing gas flow (X direction)) of a cathode 241 are inclined.

The opposite side surfaces 243 and 245 have a plurality of grooves (slits) 247 formed thereon along the direction of oxidizing gas flow.

Thus, the present embodiment yields effects similar to those yielded by the fifth embodiment described above, as well as an advantage that oxidizing gas flows further smoothly.

The inclined side surfaces of the anode may have similar slits formed thereon.

The present invention is not limited to the embodiments described above, but may be embodied in various other forms without departing from the scope of the invention.

(1) For example, according to the manufacturing method in the first embodiment described above, by use of the mask whose inner peripheral surface of the opening is inclined, the cathode having inclined side surfaces is formed. However, another method may be employed for forming such a cathode.

Figure 12:
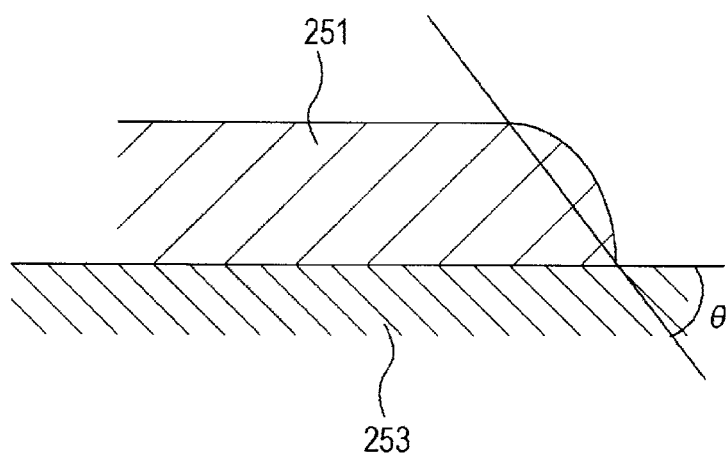
FIG. 12 A set of explanatory views, wherein (a) shows a cathode of another fuel cell in section taken in the thickness direction, and (b) shows a cathode of still another fuel cell in section taken in the thickness direction.
Figure 12:
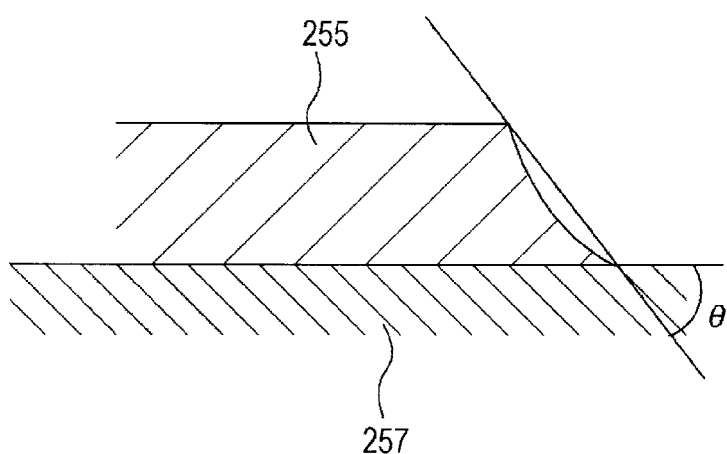
Figure 13:
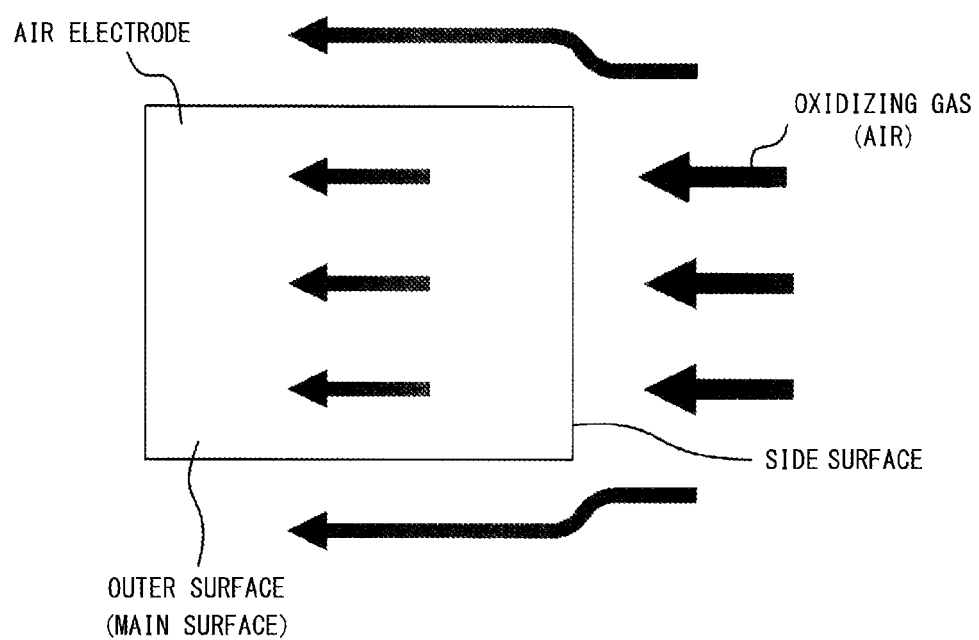
FIG. 13 Explanatory view showing a conventional technique.

For example, a low-viscosity ink having a viscosity of, for example, 50 Pa·s is prepared as material for the cathode, and, by use of a mask whose inner peripheral surface of an opening is not inclined, a green cathode layer is formed through thick-film printing, followed by drying. In the process of drying, side surfaces of the green cathode layer are curved as shown in FIG. 12(a) and are thereby inclined. Thus, after firing, the side surfaces of the cathode are inclined.

The inclination angle θ of the thus curved side surface may be defined as an angle between a line which connects a curve starting point at the upper end of the side surface of a cathode 251 and a curve starting point at the lower end of the side surface, and the lower surface (e.g., the upper surface of a solid oxide body 253). Also, in the case where the side surface of a cathode 255 is concave as shown in FIG. 12(b), the inclination angle θ of the side surface may be defined as an angle between a line which connects a curve starting point at the upper end of the side surface of a cathode 255 and a curve starting point at the lower end of the side surface, and the lower surface (e.g., the upper surface of a solid oxide body 257).

(2) Also, for example, an ink having a viscosity of, for example, 50 Pa·s is prepared as material for the cathode, and, by use of a mask whose inner peripheral surface of an opening is not inclined, a green cathode layer is formed through thick-film printing, followed by drying and firing. In this case also, side surfaces of the green cathode layer are curved as shown in FIG. 12(a) and are thereby inclined. Thus, after firing, the side surfaces of the cathode are inclined.

DESCRIPTION OF REFERENCE NUMERALS

1: fuel cell stack
3: fuel cell
31: fuel gas flow path
33, 144, 163, 183, 203, 221: anode
35: air flow path
37, 145, 165, 185, 205, 253, 257: solid oxide body
39, 147, 167, 187, 207: reaction prevention layer
41, 141, 161, 181, 201, 227, 241, 251, 255: cathode
55: frame structure
61, 149, 169, 189: lower layer
63, 143, 171, 191: upper layer
65: outer surface
67, 69, 173, 175, 209, 211, 223, 225, 229, 231, 243, 245: side surface

The invention claimed is:

1. A fuel cell assuming the form of a flat plate and comprising:
   a cathode formed on one side of an electrolyte and an anode formed on the other side of the electrolyte, the cathode or the anode having a platelike structure having a predetermined thickness,
   wherein the fuel cell further comprises a first flow path formed on a side toward the cathode and adapted to supply oxidizing gas as a reactant to the cathode from a first direction perpendicular to a thickness direction of the cathode, and a second flow path formed on a side toward the anode and adapted to supply fuel gas as a reactant to the anode from a second direction perpendicular to a thickness direction of the anode, and
   wherein the fuel cell is characterized in that:
   (i) a first side surface of the platelike structure intersecting with the direction from which a corresponding reactant is supplied, is inclined such that a first end of the inclined first side surface on a side opposite the electrolyte is located downstream, along a corresponding reactant flow direction, of a second end of the inclined first side surface on a side toward the electrolyte,
   (ii) a second side surface of the platelike structure intersecting with the direction from which the corresponding reactant is supplied, is inclined such that a first end of the inclined second side surface on the side opposite the electrolyte is located upstream, along the corresponding reactant flow direction, of a second end of the inclined second side surface on the side toward the electrolyte, and
   (iii) the first side surface is located upstream along the reactant flow direction of the second side surface, and
   wherein the platelike structure has a main outer surface on the side opposite to the electrolyte which is adapted to supply the corresponding reactant,
   wherein the cathode comprises a cathode active layer and a diffusion layer formed on a surface of the cathode active layer and allowing the oxidizing gas to diffuse to the cathode active layer, and
   only the diffusion layer is configured to be inclined.

2. A fuel cell assuming the form of a flat plate and comprising:
   a cathode formed on one side of an electrolyte and an anode formed on the other side of the electrolyte, each of the cathode and the anode having a platelike structure having a predetermined thickness
   wherein the fuel cell further comprises a first flow path formed on a side toward the cathode and adapted to supply oxidizing gas as a reactant to the cathode from a first direction perpendicular to a thickness direction of the cathode, and a second flow path formed on a side toward the anode and adapted to supply fuel gas as a reactant to the anode from a second direction perpendicular to a thickness direction of the anode, and wherein the fuel cell is characterized in that:
- (i) a first side surface of the platelike structure intersecting with the direction from which a corresponding reactant is supplied, is inclined such that a first end of the inclined first side surface on a side opposite the electrolyte is located downstream, along a corresponding reactant flow, of a second end of the inclined first side surface on a side toward the electrolyte, and
- (ii) a second side surface of the platelike structure intersecting with the direction from which the corresponding reactant is supplied, is inclined such that a first end of the inclined second side surface on the side opposite the electrolyte is located upstream, along the corresponding reactant flow, of a second end of the inclined second side surface on the side toward the electrolyte, and
- (iii) the first side surface is located upstream along the reactant flow direction of the second side surface, and wherein each of the platelike structures has a main outer surface on the side opposite to the electrolyte which is adapted to supply the corresponding reactant, the cathode comprises a cathode active layer and a diffusion layer formed on a surface of the cathode active layer and allowing the oxidizing gas to diffuse to the cathode active layer, and only the diffusion layer is configured to be inclined.

3. A fuel cell as claimed in claim 1, wherein the side surface is inclined at an angle of 30° to 85° with respect to a surface of the electrolyte.

4. A fuel cell as claimed in claim 1, wherein the inclined side surface has a slit formed thereon along at least one of the first direction and the second direction.

5. A fuel cell as claimed in claim 1, wherein the inclined side surface is a smooth surface or a stepped surface.

6. A fuel cell as claimed in claim 1, wherein the fuel cell is a solid oxide fuel cell which uses a solid oxide as an electrolyte.

7. A fuel cell stack comprising a single or a plurality of the fuel cells as claimed in claim 1.

8. A fuel cell as claimed in claim 2, wherein the side surface is inclined at an angle of 30° to 85° with respect to a surface of the electrolyte.

9. A fuel cell as claimed in claim 2, wherein the inclined side surface has a slit formed thereon along at least one of the first direction and the second direction.

10. A fuel cell as claimed in claim 2, wherein the inclined side surface is a smooth surface or a stepped surface.

11. A fuel cell as claimed in claim 2, wherein the fuel cell is a solid oxide fuel cell which uses a solid oxide as an electrolyte.

12. A fuel cell stack comprising a single or a plurality of the fuel cells as claimed in claim 2.

* * * * *